United States Patent
Tristan et al.

(10) Patent No.: US 11,636,308 B2
(45) Date of Patent: Apr. 25, 2023

(54) DIFFERENTIABLE SET TO INCREASE THE MEMORY CAPACITY OF RECURRENT NEURAL NETWORKS

(71) Applicant: Oracle International Corporation, Redwood Shores, CA (US)

(72) Inventors: Jean-Baptiste Tristan, Lexington, MA (US); Michael Wick, Medford, MA (US); Manzil Zaheer, Pittsburgh, PA (US)

(73) Assignee: Oracle International Corporation, Redwood Shores, CA (US)

( * ) Notice: Subject to any disclaimer, the term of this patent is extended or adjusted under 35 U.S.C. 154(b) by 737 days.

(21) Appl. No.: 15/339,303

(22) Filed: Oct. 31, 2016

(65) Prior Publication Data
US 2018/0121792 A1 May 3, 2018

(51) Int. Cl.
*G06N 3/04* (2023.01)
*G06N 3/08* (2023.01)
*G06N 3/044* (2023.01)
*G06N 3/084* (2023.01)

(52) U.S. Cl.
CPC ............. *G06N 3/044* (2023.01); *G06N 3/084* (2013.01)

(58) Field of Classification Search
CPC .............................. G06N 3/0445; G06N 3/084
See application file for complete search history.

(56) References Cited

PUBLICATIONS

Kurach, K., Andrychowicz, M. and Sutskever, I., 2015. Neural random-access machines. arXiv preprint arXiv:1511.06392. (Year: 2015).*
Tang, D., Qin, B., Feng, X. and Liu, T., 2015. Effective LSTMs for target-dependent sentiment classification. arXiv preprint arXiv:1512.01100. (Year: 2015).*
Rae et al., "Scaling Memory-Augmented Neural Networks with Sparse Reads and Writes," Oct. 27, 2016, arXiv:1610.09027v1 [cs.LG], 17 pages (Year: 2016).*
Chauhan et al., "Finding Similar Items using LSH and Bloom Filter," 2014, IEEE International Conference on Advanced Communication Control and Computing Technologies, pp. 1662-1666 (Year: 2014).*

(Continued)

*Primary Examiner* — Miranda M Huang
*Assistant Examiner* — Robert Lewis Kulp
(74) *Attorney, Agent, or Firm* — Hickman Becker Bingham Ledema LLP; Brian N. Miller

(57) ABSTRACT

According to embodiments, a recurrent neural network (RNN) is equipped with a set data structure whose operations are differentiable, which data structure can be used to store information for a long period of time. This differentiable set data structure can "remember" an event in the sequence of sequential data that may impact another event much later in the sequence, thereby allowing the RNN to classify the sequence based on many kinds of long dependencies. An RNN that is equipped with the differentiable set data structure can be properly trained with backpropagation and gradient descent optimizations. According to embodiments, a differentiable set data structure can be used to store and retrieve information with a simple set-like interface. According to further embodiments, the RNN can be extended to support several add operations, which can make the differentiable set data structure behave like a Bloom filter.

28 Claims, 3 Drawing Sheets

(56) References Cited

PUBLICATIONS

Graves et al., "Hybrid computing using a neural network with dynamic external memory," Oct. 27, 2016, Nature, vol. 538, 21 pages (Year: 2016).*
Spithourakis et al. ("Numerically Grounded Language Models for Semantic Error Correction", https://arxiv.org/pdf/1608.04147.pdf, arXiv:1608.04147v1 [cs.CL] Aug. 14, 2016, pp. 1-6) (Year: 2016).*
Gulcehre et al. ("Dynamic Neural Turing Machine with Soft and Hard Addressing Schemes," https://arxiv.org/abs/1607.00036v1, arXiv:1607.00036v1 [cs.LG] Jun. 30, 2016, pp. 1-13) (Year: 2016).*
Patraucean et al. ("Spatio-Temporal Video Autoencoder with Differentiable Memory", https://arxiv.org/pdf/1511.06309.pdf, arXiv:1511.06309v5 [cs.LG] Sep. 1, 2016, pp. 1-13) (Year: 2016).*
Wikipedia, "Softmax Function", https://en.wikipedia.org/wiki/Softmax_function, last viewed on dated Oct. 24, 2016, 3 pages.
Wikipedia, "Bloom Filter", https://en.wikipedia.org/wiki/Bloom_filter, last viewed on Oct. 14, 2016, 14 pages.
Sainbayar Sukhbaatar, Arthur Szlam, Jason Weston, and Rob Fergus. "Weakly Supervised Memory Networks". CoRR, abs/1503.08895, 2015, 9 pages.
Lipton, et al., "A Critical Review of Recurrent Neural Networks for Sequence Learning", dated Jun. 5, 2015, 38 pages.
Edward Grefenstette, Karl Moritz Hermann, Mustafa Suleyman, and Phil Blunsom. "Learning to Transduce With Unbounded Memory". CoRR, abs/1506.02516, 2015, 9 pages.
Armand Joulin and Tomas Mikolov. Inferring Algorithmic Patterns with Stack-augmented Recurrent Nets. CoRR, abs/1503.01007, 2015, 10 pages.
Alex Graves, Greg Wayne, and Ivo Danihelka. "Neural Turing Machines". CoRR, abs/1410.5401, 2014, 26 pages.

* cited by examiner

┌─ 102
TRAIN, BASED ON A SET OF SEQUENTIAL TRAINING DATA, A RECURRENT NEURAL NETWORK THAT IS EQUIPPED WITH A DIFFERENTIABLE SET DATA STRUCTURE; WHEREIN TRAINING THE RECURRENT NEURAL NETWORK PRODUCES A TRAINED RECURRENT NEURAL NETWORK

↓

┌─ 104
IDENTIFY ONE OR MORE PROPERTIES OF A SEQUENCE OF UNLABELED DATA BASED, AT LEAST IN PART, ON THE TRAINED RECURRENT NEURAL NETWORK AND THE DIFFERENTIABLE SET DATA STRUCTURE

↓

┌─ 106
STORING, TO MEMORY, THE ONE OR MORE PROPERTIES OF THE SEQUENCE OF UNLABELED DATA

DIFFERENTIABLE SET TO INCREASE THE MEMORY CAPACITY OF RECURRENT NEURAL NETWORKS

FIELD OF THE INVENTION

The present invention relates to training a recurrent neural network, equipped with a differentiable set data structure, and using the trained recurrent neural network to identify long dependencies in unlabeled data.

BACKGROUND

Machine learning can encode, within trained models, classification algorithms to classify sequential data (such as: natural language sentences; a series of events resulting from user interaction with a website; network streams; etc.). Classification algorithms classify portions of sequential data with labels, and accurate classification algorithms can be used to glean information from sequential data without intervention of a human. For example, a machine learning algorithm uses a small amount of labeled data to learn an algorithm that classifies English sentences as having positive, negative, or neutral sentiments. As further examples, such a machine learning algorithm can learn whether the behavior, of a consumer represented as a time-series of an online profile, has changed; or to detect attackers in network traffic; or even to automatically find semantic mistakes in computer programs.

One of the key difficulties of training a machine learning model to apply such classifiers is that there can be relevant long dependencies in a sequence such as an English sentence. Consider the following example sequence of data: Remember this number: 42. What number did I ask you to remember? If a learning algorithm is used to go over such text and answer the questions in it, the learning algorithm would need to store the information "42". This example demonstrates a long dependency in sequence data.

Most of the solutions for sequence classification are feature-based and extract n-grams features to learn a traditional classifier. Such classification schemes take into account individual components of data being classified without reference to the sequence of the components of the data. As such, feature-based classification does not accurately classify sequential data if there are long dependencies.

Another approach to classifying sequential data with dependencies is used by Hidden Markov Models or recurrent neural networks. This approach can take into account the order of components of the data being classified. However, the memory mechanism used by this approach degrades rapidly since the gradients used for the memory mechanism tend toward zero or infinity.

Specifically, backpropagation (or "backward propagation of errors"), which is a technique used to train a model (such as a recurrent neural network) using training data, assigns values to parameters within a recurrent neural network to train the recurrent neural network to reflect a particular model that conforms to the training data. The values that backpropagation assigns to the parameters within a recurrent neural network are based on value derivatives that are propagated through the neural network. The longer the neural network (where the length of the network depends on the length of the sequential data), the more distorted the propagated derivatives become. As such, this approach, while useful for short-term dependencies, becomes ineffective for long-term dependencies within the sequence being analyzed.

Yet another approach to classifying sequential data with dependencies equips a recurrent neural network with a differentiable stack to cope with dependencies in the sequential data. Given the nature of a stack, equipping a recurrent neural network with a stack enables pushing values onto the stack and popping values off the stack in FIFO (first in, first out) order. Such a pairing is useful for keeping track of certain kinds of information, such as tracking open and close parenthesis characters in a sequence of information. However, the utility of a stack is limited to FIFO tracking and, as such, it can be difficult to use such a stack to track many kinds of long dependencies in sequential data, such as tracking particular numbers seen within a sequence of data and then recalling whether a particular number has been seen.

As such, it would be beneficial to equip a recurrent neural network with a differentiable data structure that allows the recurrent neural network to effectively retain information for long dependencies within sequential data and use this long dependency information to classify unlabeled sequential data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 depicts a flowchart for training a recurrent neural network equipped with a differentiable set data structure and using the trained model to classify unlabeled sequential data.

DETAILED DESCRIPTION

Figure 2:
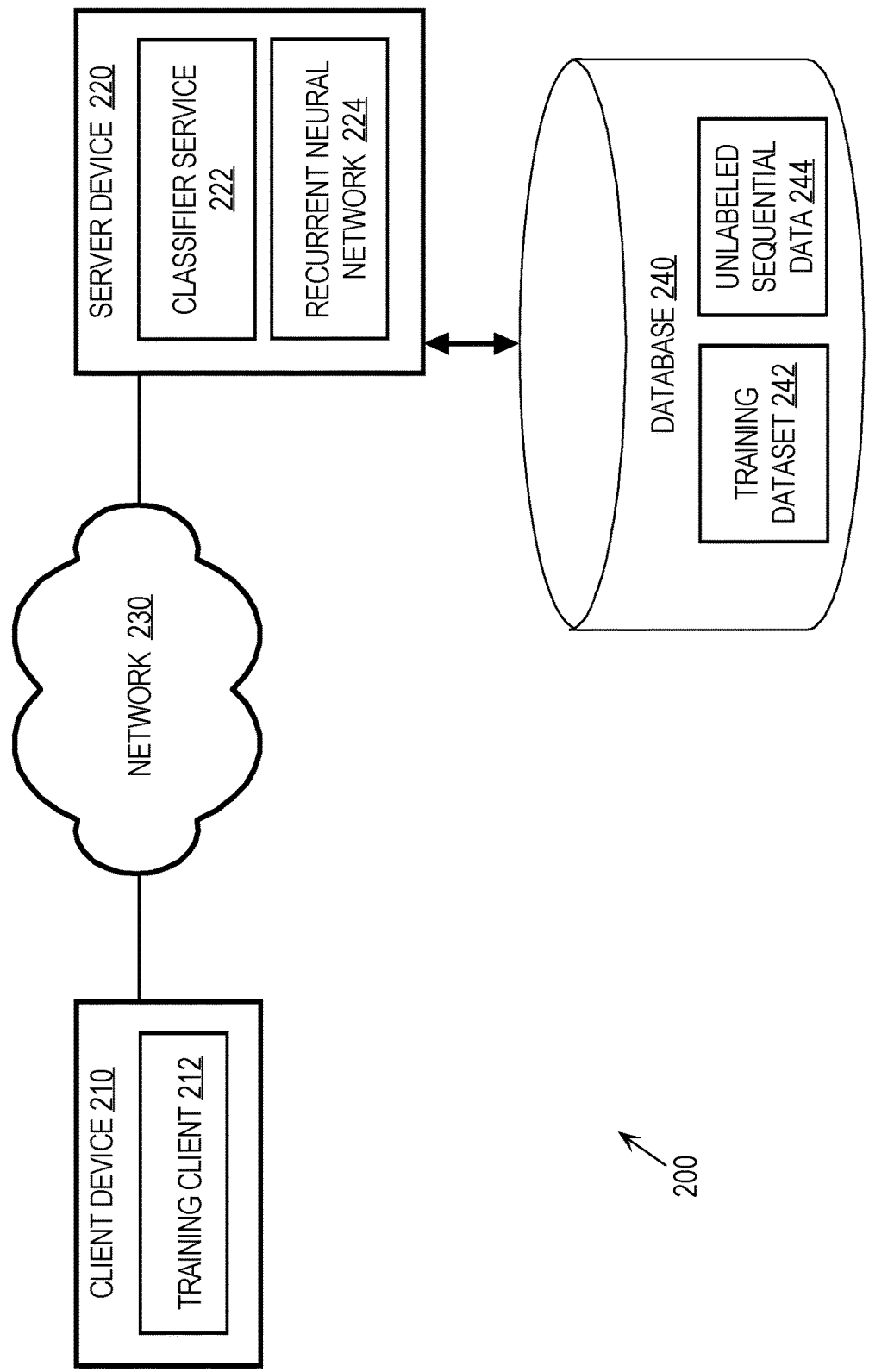
FIG. 2 is a block diagram that depicts an example network arrangement for training a recurrent neural network, equipped with a differentiable set data structure, to recognize long dependencies within sequential data.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to embodiments, a recurrent neural network (RNN) is equipped with a set data structure whose operations are differentiable, which data structure can be used to store information for a long period of time. This differentiable set data structure can "remember" an event in the sequence of sequential data that may impact another event much later in the sequence, thereby allowing the RNN to classify the sequence based on many kinds of long dependencies. For example, in the context of the sequence of data "Remember this number: 42. What number did I ask you to remember?", a set data structure can be used to store the number "42" to allow the model (equipped with the set data structure) to inform the answer to the later question that requires that information.

Since operations on a differentiable set data structure are continuous, an RNN that is equipped with a differentiable set data structure can be properly trained with backpropagation and gradient descent optimizations. (For additional information about recurrent neural networks, see *A Critical Review of Recurrent Neural Networks for Sequence Learning* by Zachary C. Lipton, John Berkowitz, and Charles Elkan, published Jun. 5, 2015, the entire contents of which is hereby incorporated by reference as if fully set forth herein.) As such, during training of the RNN, elements are added to the set and retrieved from the set with some probability.

According to embodiments, a differentiable set data structure can be used to store and retrieve information with a simple set-like interface. According to further embodiments, the RNN can be extended to support several add operations, which can make the differentiable set data structure behave like a Bloom filter.

Learning Task

FIG. 1 depicts a flowchart 100 for training a recurrent neural network equipped with a differentiable set data structure and using the trained model to classify unlabeled data. Specifically, at step 102 of flowchart 100, a recurrent neural network, that is equipped with a differentiable set data structure, is trained based on a set of sequential training data. For example, a user submits training dataset 242 of FIG. 2, which comprises sequential data (such as natural language sentences), to a training client 212 to be the basis upon which a Long Short-Term Memory Recurrent Neural Network (LSTM) is to be trained. Natural language sentences and words are sequential data since the words and characters of sentence and words comprise an ordered stream of data. While examples refer to LSTM-type recurrent neural networks, embodiments are not limited to a certain kind of recurrent neural network.

A training dataset, such as training dataset 242, is used to fit a particular model in order to classify particular information that is exemplified in the training dataset. Training dataset 242 is composed of sequences of information and associated labels. The sequences of information are defined over a vocabulary V plus the special symbol "!". Each sequence is of the form $e_1!e_2$ where $e_1$ belongs to the language V* and $e_2$ can be any permutation of any subset of V. The set of such sequences is denoted herein as D.

To illustrate, the following sequences over the vocabulary {a, b, c} are syntactically valid:
aaabab!cba
cba!ac
!a
cbccac!

According to embodiments, a sequence is defined to be semantically valid if and only if any character appearing after the "!" symbol also appears before it. Thus, in the context of the above examples of sequential data, "cba!ac" and "cbccac!" are semantically valid, and "aaabab!cba" and "!a" are not semantically valid. More formally, for any sequence e∈V*, v∈e if there exists two sequences $e_1 \in V^*$ and $e_2 \in V^*$ such that $e = e_1 v e_2$. As such, a sequence $e = e_1!e_2$ is defined to be semantically valid if and only if it satisfies the property $\forall v \in e_2, \exists v' \in e_1$.

If a sequence is semantically valid, it is given the label 1 within the training dataset; if a sequence is semantically invalid, it is given the label 0 within the training dataset. According to embodiments, training dataset 242 contains an equal number of semantically valid and invalid sequences (labeled as such). An algorithm that randomly predicts whether or not a sequence is semantically valid is expected to have an accuracy of 0.5 and an algorithm that perfectly predicts the semantic validity of a sequence is expected to have an accuracy of 1.

Long Short-Term Memory Recurrent Neural Networks

To classify sequences of data as semantically valid or invalid using machine learning, a state-of-the-art solution is to model the sequences using a Long Short-Term Memory Recurrent Neural Network (LSTM). An LSTM may be trained to fit a dataset D (as described below), which includes sequential data. Herein, a dataset that includes sequential data is referred to as a sequential dataset.

Let x∈D, where $x_t$ represents the letter at position t, and assume that t∈[1..T]. As such, x represents an input to the LSTM, which occurs at position t within the ordered sequence of data in dataset D.

The LSTM is defined recursively as a function f over the sequence x and produces a label f(x)∈[0, 1]. The LSTM contains two internal vectors h and c both of size L. The LSTM is composed of several linear transformations of the form a*x+b whose "constants" a and b are the parameters of the model, which parameters need to be optimized at training time and which are fixed at test time. The set of parameters for an LSTM (not including parameters for a differentiable set data structure with which the LSTM is equipped) is $W_x$, $W_h$, $b_h$, $W_{xi}$, $W_i$, $b_i$, $W_{xf}$, $W_f$, $b_f$, $W_{xo}$, $W_o$, $b_o$, $W_y$, $b_y$. All of these parameters of the model are referred to collectively as θ. As such, LSTM is defined as follows.

$$s_t = \tanh(W_x[x_t] + h_{t-1}W_h + b_h) \quad (1)$$

where $W_x \in \mathbb{R}^{V \times L}$, $W_h \in \mathbb{R}^{L \times L}$, $b_h \in \mathbb{R}^L$ $$i_t = \sigma(W_{xi}[x_t] + h_{t-1}W_i + b_i) \quad (2)$$

where $W_{xi} \in \mathbb{R}^{V \times L}$, $W_i \in \mathbb{R}^{L \times L}$, $b_i \in \mathbb{R}^L$ $$f_t = \sigma(W_{xf}[x_t] + h_{t-1}W_f + b_f) \quad (3)$$

where $W_{xf} \in \mathbb{R}^{V \times L}$, $W_f \in \mathbb{R}^{L \times L}$, $b_f \in \mathbb{R}^L$ $$o_t = \sigma(W_{xo}[x_t] + h_{t-1}W_o + b_o) \quad (4)$$

where $W_{xo} \in \mathbb{R}^{V \times L}$, $W_o \in \mathbb{R}^{L \times L}$, $b_o \in \mathbb{R}^L$ $$c_t = s_t * i_t + c_{t-1} * f_t \quad (5)$$

$$h_t = \tanh c_t * o_t \quad (6)$$

$$f(x) = \sigma(h_T W_y + b_y) \quad (7)$$

where $W_y \in \mathbb{R}^L$, $b_y \in \mathbb{R}$

Finally, to fit the LSTM to a dataset D, the parameters of the LSTM are updated to minimize the following loss (or "objective") function.

$$\epsilon = \sum_{(x,y) \in D} (y - f(x))^2 \quad (8)$$

Objective function (8) represents, in summary, that in training the LSTM over dataset D, the LSTM parameters should be updated to minimize the difference between the ground truth y (with which an input x is labeled within D) and the result of running the function f over input x. For example, input x represents a sentence that, within dataset D, has been labeled as a positive sentiment (y).

The parameters of the LSTM (θ) are adjusted using backpropagation such that the result of running function f over x comes as close to the labeled ground truth as possible. This is a non-convex optimization problem that is approximated using stochastic gradient descent (or any of its improved versions, such as stochastic gradient descent with momentum, AdaDelta, RMSProp, Adam, etc.). This works by repeatedly randomly choosing a pair (x, y) from D and then updating the parameters of the model as such:

$$\theta = \theta - \eta \nabla_\theta (y - f(x))^2 \quad (9)$$

According to embodiments, because of how the model is fitted to the data, f must be differentiable.

Using an LSTM alone, without being equipped with a set data structure, to solve the given task is a very good solution, and gives much better results than any other machine learning solution. However, an LSTM alone does not obtain a perfect accuracy. This is problematic since this simple task exemplifies a key problem in more realistic tasks: there is a need for the neural network to "remember" values for an arbitrary amount of steps.

Differentiable Set Data Structure

Using solutions other than machine learning to solve the task, the letters encountered before the "!" symbol could be added to a set, and then the set could be queried to make sure a particular sequence is semantically valid. However, equipping an LSTM with such a set is challenging.

Specifically, it is difficult to design a set data structure so that all of its operations are differentiable and such that it can be reliably trained and added to a noisy recurrent neural network. First, the LSTM must learn whether to add an element to the set or query the set, which means that at training time, the LSTM does not add or query the set, but does a mixture of the two. Also, because f must be differentiable, all operations—on the set data structure with which the LSTM is equipped—must be differentiable as well.

For a set data structure to be differentiable, the operations on the set (such as adding or removing an element) must be continuous. For example, to add a particular word to a non-differentiable set of words, the word is simply included in the set. Such a non-differentiable set data structure may contain the words {"dog"; "cat"; "mouse"}. Such a set is not differentiable because the outcome of a search on such a set is drastically different, i.e., is either true or false, depending on whether a given word is included in the set.

In contrast, a particular word is added to a differentiable set data structure with some probability or weight. Since embodiments train the LSTM using backpropagation, all of the operations that appear in the model (and, thereby, in the objective functions of the LSTM) must be differentiable. Associating the values included in the set data structure with probabilities (rather than wholly including or excluding a value) makes it possible to take a derivative of the set, which is a necessary part of training the model using backpropagation.

Such a differentiable set data structure may contain the following words with the associated probabilities: {"dog": 0.2; "cat": 0.9; "mouse": 0.75}. Thus, the differentiable set data structure represents a logical set of values, where each value stored in the differentiable set data structure is associated with the probability that the value is included in the logical set of values.

Classifier service 222 may use a model equipped with a differentiable set data structure to search for a particular value within the differentiable set data structure and return some probability (i.e., the probability associated with the value in the set) that the value is included in the set.

Differentiable Set Data Structure that Can be Used with Backpropagation

Not only should a set data structure with which an LSTM is equipped be differentiable, but the data structure must also function as a set during training using backpropagation. There are many ways to design a set to be differentiable, but a differentiable set will not necessarily function properly during backpropagation (in other words, the model will not be able to "learn" long dependencies within sequential data using the set). Proper functioning of the set during backpropagation is critical to successfully fit the extended model, since the utility of equipping an LSTM with a differentiable set data structure is in fitting the model to the data in a way where the model generalizes to new test data.

The previously defined LSTM (i.e., defined above in connection with functions (1)-(9)) is equipped with a differentiable set data structure as represented in formulas (10)-(13) below. Specifically, formulas (10)-(13) represent a particular design of many possible designs of equipping an LSTM with a differentiable data structure. According to embodiments, during training of the LSTM, training client 212 performs functions (1)-(13) to train RNN 224. First, a new internal vector d, which represents the differentiable set, is added to the LSTM. The size of d (denoted herein as K) can be chosen independently of the size of the hidden vector of the LSTM.

At each time step, the LSTM will generate a control command that indicates a probability of whether a given value is to be added to the set. For example, an input sentence x that is input to the LSTM as part of training dataset 242, is as follows: "The cat is in the hat." At time t, the LSTM inputs the word "cat" and determines whether the selected word is to be added to the set, as explained in further detail below.

The control is generated from the hidden state (ht) of the LSTM, which encodes information about the portion of data over which the LSTM has been trained as of time t.

$$a_t = \sigma(h_t W_a + b_a) \quad (10)$$

where $W_a \in \mathbb{R}^{L \times 1}$, $b_a \in \mathbb{R}$

According to embodiments, σ (or the sigmoid function) is used as the activation function within formula (10), as opposed to other activation functions (such as the tanh function).

The $a_t$ emitted by formula (10) is a single value between 0 and 1, which is a control value that represents a likelihood that the selected word within the input sentence should be added to the logical set of values represented by the differentiable data set. Continuing with the previous example, the emitted $a_t$ is 0.9, which is the likelihood that the word "cat" from the input sentence should be added to the logical set of values.

At each time step, the LSTM also generates a data value. According to embodiments, the data value serves two purposes; the data value is going to serve as the query value, but also as the value to add to the set. There are different design possibilities, for example, two data commands may be generated, one for the addition and one for the query. The set can be thought of as an array, and the value is a pointer to a cell in the array. Note that the representation of the value in the set is not decided but learned, which makes training much more difficult.

$$v_t = \text{softmax}(\sigma(h_t W_v + b_v)) \quad (11)$$

where $W_v \in \mathbb{R}^{L \times K}$, $b_v \in \mathbb{R}^K$

According to embodiments, σ (sigmoid) is used as the activation function within formula (11), as opposed to other activation functions such as the tanh function.

During training, backpropagation adjusts the parameters $W_a$, $b_a$, $W_v$, and $b_v$ to minimize the objective function as discussed in connection with the base LSTM above.

According to embodiments, $v_t$ is a vector of numbers ranging from 0 to 1, which can be interpreted as indicating at which index of the differentiable set data structure (e.g., an array) is the value being added to the set. With enough training, the values in $v_t$ will become closer to 0 or 1.

Continuing with the example above, the $v_t$ emitted by formula (11) is a vector of length K, which, in this example is '6', the length of the input sentence. According to one or more embodiments, the length K of the differentiable set data structure (where the length indicates the number of values that can be represented within the differentiable set data structure) is some value that is large enough to hold all of the values in the logical set represented by the data structure. In this example, for ease of explanation, each of the words in the input sentence are represented in d as a distinct value, and the words are represented in the order in which the words appear within the differentiable set data structure. However, values may be represented, within the differentiable set data structure, in any order, and not all values found in the input data are necessarily represented within the data structure, according to embodiments.

The RNN learns, via the training process, what words should be included in the differentiable set data structure and at what positions the words should appear within the data structure. For example, if the input data comprises English sentences, then the input set is the English vocabulary, and the RNN learns, via the training process, how to map the vocabulary words to positions in the differentiable set data structure.

At training time according to the above example, sigmoid $(h_t W_v + b_v)$ results in the vector [0.1, 0.9, 0, 0, 0, 0.3]. Based on application of the softmax function, which normalizes the vector, application of formula (11) causes training client 212 to emit the vector $v_t$: [0.1, 0.3, 0.1, 0.2, 0.2, 0.4]. (Additional information about "softmax" is found in the Wikipedia article "Softmax function", which is found at the time of drafting at "en.wikipedia.org/wiki/Softmax_function", the entire contents of which is hereby incorporated by reference as if fully set forth herein.) The values in $v_t$ indicate whether the corresponding word within the input sentence is the selected word within the input sentence, where the selected word has been selected for determination of whether the word should be included in the logical set represented by the differentiable set data structure.

At training time, $v_t$ is not composed of 0's and 1's because the RNN is learning little by little how to encode each value, such as the word "cat" in the above example, in the differentiable set data structure. However, by the end of the training, the encoding will be closer to encodings that will be produced at test time. For example, at test time, the trained RNN 224 emits a $v_t$ [0, 1, 0, 0, 0, 0], which means that the $2^{nd}$ position in the array is used to remember whether the word "cat" is included in the logical set.

Finally, the set is updated by adding, to the set data structure, the product of the value and the action. Note that to avoid having values in the set data structure go over 1, the min function is used. The min function is not differentiable, however, it has subderivatives which can be used as gradient and it has been verified experimentally that this does not prevent fitting the model to the data. This update is particularly interesting because it is not obvious that it should work at all to train a model containing such an update. Indeed, especially in early training, there is a risk that all the indices in the set saturate to 1 which would prevent the set from providing useful information. And yet, the model has been fitted with the set perfectly reliably.

$$d_t = \min(d_{t-1} + a_t * v_t, 1) \quad (12)$$

Specifically, in formula (12), vector a, which represents the probabilities that the values (indexed by t within the sequence of data) should be included in the differentiable set, is pointwise multiplied by vector v, which represents which of the T values is being added to the set. This pointwise multiplication results in a vector (referred to here as $a_t * v_t$) that represents the probabilities of only the value that is being added to the set. As the model is being trained, the values in vectors a and v get closer and closer to 1 or 0. Again continuing with the above example, pointwise multiplication of $a_t$ (0.9) and $v_t$ ([0.1, 0.3, 0.1, 0.2, 0.2, 0.4]) results in the vector $a_t * v_t$: [0.09, 0.27, 0.09, 0.18, 0.18, 0.36]. According to embodiments, if $a_t$ is 0 then the set (d) is unmodified. If $a_t$ is 1 then the bit in d that corresponds to $v_t$ is set to 1 (assuming that $v_t$ has one position set to 1 and all other positions set to 0).

The vector d represents the differentiable set data structure (which, according to non-limiting embodiments is implemented as an array) and $d_t$ represents d at time t. Since both d and $a_t * v_t$ are vectors, addition of d and $a_t * v_t$ results in a vector that stores each value from a pointwise addition of the values in the two vectors. Thus, formula (12) pointwise adds $a_t * v_t$ to $d_{t-1}$ and ensures that the values in d do not exceed 1, which results in an updated d. For purposes of the given example, $d_{t-1}$ is [0.1, 0.9, 0.05, 0.2, 0.1, 0.3]. Thus, the pointwise addition of $a_t * v_t$ to $d_{t-1}$ results in the vector [0.19, 1.17, 0.14, 0.38, 0.28, 0.66]. Since $d_t$ is assigned the min of the resultant vector and 1, $d_t$ is updated to be [0.19, 1, 0.14, 0.38, 0.28, 0.66] (where the second position is replaced with a 1 instead of 1.17).

Finally, according to embodiments, the output is updated to use the set directly. Note that this is a key part of the design. The result of the query could be sent back to the hidden state of the LSTM and then the prediction is generated from the hidden state. However, such design is much less reliable because the fitting of the model becomes more dependent on the initialization.

To use the set directly, formula (13) is utilized.

$$y_t = d_t \cdot v_t \quad (13)$$

Specifically, formula (13) reads a value ($y_t$) from d. Vector $v_t$ indicates the location to be read, and the dot product of $v_t$ with $d_t$ results in the value within $d_t$ indicated by $v_t$. For example, formula (13) may be used to determine whether the value at index '6' is in the logical set with which the model is equipped. To do so, formula (11) emits the vector where all but position 6 has a value of '0' and position 6 has a value of '1'. Then, the dot product of this $v_t$ with $d_t$ (which is the differentiable set data structure that represents what is included in the logical set) will return the value within $d_t$ that is stored for index 6. This value indicates whether the value represented by index 6 is included in the logical set (i.e., if $y_t$ is '1', then the value at index 6 is included in the logical set, and if $y_t$ is '0', then the value at index 6 is not included in the logical set).

Again continuing with the previous example, the dot product of $d_t$ ([0.19, 1, 0.14, 0.38, 0.28, 0.66]) and $v_t$ ([0.1, 0.3, 0.1, 0.2, 0.2, 0.4]) results in $y_t$=0.729. Thus, since $y_t$=0.729, the RNN 224 has indicated that there is a 72.9% chance that the selected value is within the logical set of values represented by the differentiable set data structure.

At training time, once the network outputs such a value, say 72.9%, this value is compared to the true output as indicated by labels in training dataset 242. If the true output is 100%, then we are off by 27.1% and backpropagation then adjusts the parameters of the RNN (including the parameters in formulas (1)-(13) as indicated above) in such a way that, on the above-described example, the RNN 224 would now produce a value closer to 100%.

According to embodiments, an RNN equipped with a differentiable set data structure is reliably trainable, and allows to reach perfect accuracy for the task of training the model for long dependencies. Early on, when the model is being trained, the values in the differentiable set data structure ($d_t$) are somewhere between 0 and 1, but not perfectly 0 or 1. However, given the particular design of formulas that are used to train the LSTM to populate the differentiable set data structure (embodiments described above), the LSTM learns to populate $d_t$ (and also $v_t$) with 0 and 1, as appropriate. In this way, the LSTM learns to use the differentiable set data structure as a proper set, where values are either included or excluded fully. The LSTM learns to use the differentiable set data structure as a proper set because the differentiable set data structure is differentiable in the first place (and can be trained using backpropagation).

Finally, the outputs coming after the "!" symbol are aggregated together to decide whether or not the sequence is semantically valid. At test time, for every character following the "!" symbol, the LSTM outputs a Boolean value to say whether or not the character occurred before the "!" sign. The aggregation computes the 'and' of all these Booleans to ensure that all of the outputs are true. If any output is false, then the overall result will be false.

Application of a Trained RNN Equipped with a Set Data Structure

Returning to the discussion of flowchart 100 of FIG. 1, at step 104, one or more properties of a sequence of unlabeled data are identified based, at least in part, on the trained recurrent neural network and the differentiable set data structure. For example, after recurrent neural network (RNN) 224 is trained based on training dataset 242, classifier service 222 uses trained RNN 224 to classify a portion of unlabeled sequential data 244.

At test time (during classification of unlabeled data), the trained model comprises a function from an input sequence to a label since the parameters of the model have all been set during training. Thus, classifier service 222 applies trained RNN 224 to the input in data 244 by executing equations (1) to (13) (with the trained parameters) on the input. The one thing to note is that at that point, because training is complete and backpropagation is no longer needed, the commands are turned from "soft" to "hard". For example, at training time, a value might be a distribution of the form (0.1, 0.8, 0.1) indicating that the pushed value is the middle one. At test time, this vector becomes (0,1,0). The same is done for the "v" and the "a" commands.

At step 106, the one or more properties of the sequence of unlabeled data are stored to memory. For example, classifier service 222 causes classification data, produced by classifying the unlabeled sequential data 244 using trained RNN 224, to be stored within database 240.

Additions and Extensions

Previously-described embodiments involve adding a single value to the array that implements the differentiable set equipped to the LSTM. However, according to one or more embodiments, the design is extended to equip the LSTM with more value generation of the form $v_t$=softmax ($\sigma(h_t W_v + b_v)$) while reducing the size of the set data structure from K to a smaller number. In such a case, the value generator can be thought of as hash function in a Bloom filter and can potentially allow representation, with fewer bits, of a set having many values.

Specifically, embodiments have multiple a vectors, such as $a_{1t}$, $a_{2t}$, $a_{3t}$, etc., and corresponding multiple v vectors $v_{1t}$, $v_{2t}$, $v_{3t}$, etc. In so doing, embodiments equip an LSTM with a differentiable Bloom filter in which lookups and queries are implemented by looking up multiple positions within the Bloom filter, rather than looking up a single position as with the above-described differentiable set data structure. (See the article "Bloom filter" found, at the time of application drafting, at en.wikipedia.org/wiki/Bloom_filter, the entire contents of which are hereby incorporated by reference as if fully set forth herein.)

In these embodiments, in order to determine whether a particular value is stored within the logical set of values represented by the Bloom filter, the values coming out of all of the different aspects of the Bloom filter are combined. This allows a determination, with high probability, of whether the value is included in the logical set of values represented by the Bloom filter.

For example, a logical set for a given LSTM is represented as an array "A". Embodiments use this array to implement a Bloom filter. For example, the Bloom filter represents two vectors $v_1$ and $v_2$ corresponding to functions $f_1$ and $f_2$, respectively. In order to introduce a new value in the set (i.e., 42), then the system sets $A[f_1(42)]$ to 1 and sets $A[f_2(42)]$ to 1. To query whether value 42 is included in the logical set of values represented by the array, it is determined whether both $A[f_1(42)]$ and $A[f_2(42)]$ are set to 1, since the value is very likely included in the logical set if both $A[f_1(42)]$ and $A[f_2(42)]$ are set to 1.

A Bloom filter allows the information for the logical set to be stored with a smaller footprint than an array would require. Specifically, in embodiments that are implemented using an array, in order to represent 1000 values within the array, the array would need to have 1000 instantiated cells. However, for example, a Bloom filter can represent 1000 values with an array of size 10.

Architecture for a Recurrent Neural Network Equipped with a Differentiable Set Data Structure FIG. 2 is a block diagram that depicts an example network arrangement 200 for training a recurrent neural network, equipped with a differentiable set data structure, to recognize long dependencies within sequential data, according to embodiments. Network arrangement 200 includes a client device 210 and a server device 220 communicatively coupled via a network 230. Example network arrangement 200 may include other devices, including client devices, server devices, cluster nodes, and display devices, according to embodiments.

Client device 210 may be implemented by any type of computing device that is communicatively connected to network 230. Example implementations of client device 210 include, without limitation, workstations, personal computers, laptop computers, personal digital assistants (PDAs), tablet computers, cellular telephony devices such as smart phones, and any other type of computing device.

In network arrangement 200, client device 210 is configured with training client 212. Training client 212 may be implemented in any number of ways, including as a stand-alone application running on client device 210, as a plugin to a browser running at client device 210, etc. Training client 212 may be implemented by one or more logical modules. Client device 210 may be configured with other mechanisms, processes and functionalities, depending upon a particular implementation.

Network 230 may be implemented with any type of medium and/or mechanism that facilitates the exchange of information between client device 210 and server device 220. Furthermore, network 230 may facilitate use of any type of communications protocol, and may be secured or unsecured, depending upon the requirements of a particular embodiment.

Server device 220 may be implemented by any type of computing device that is capable of communicating with client device 210 over network 230. In network arrangement 200, server device 220 is configured with classifier service 222 and RNN 224. Any of the functionality attributed to classifier service 222 and/or RNN 224 herein may be performed by another entity running on server device 220, or by another entity on client device 210 or on other devices that are communicatively coupled to network 230, according to embodiments. Server device 220 may be configured with other mechanisms, hardware, processes, and functionalities, depending upon a particular implementation.

Server device 220 is communicatively coupled to database 240. According to an example embodiment, database 240 maintains information for training dataset 242 and unlabeled sequential data 244. Database 240 may reside in any type of storage, including volatile and non-volatile storage (e.g., random access memory (RAM), a removable or disk drive, main memory, etc.), and may be implemented by one or more logical databases. The storage on which database 240 resides may be external or internal to server device 220.

In an embodiment, each of the processes described in connection with training client 212, classifier service 222, and/or RNN 224 are performed automatically and may be implemented using one or more computer programs, other software or hardware elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
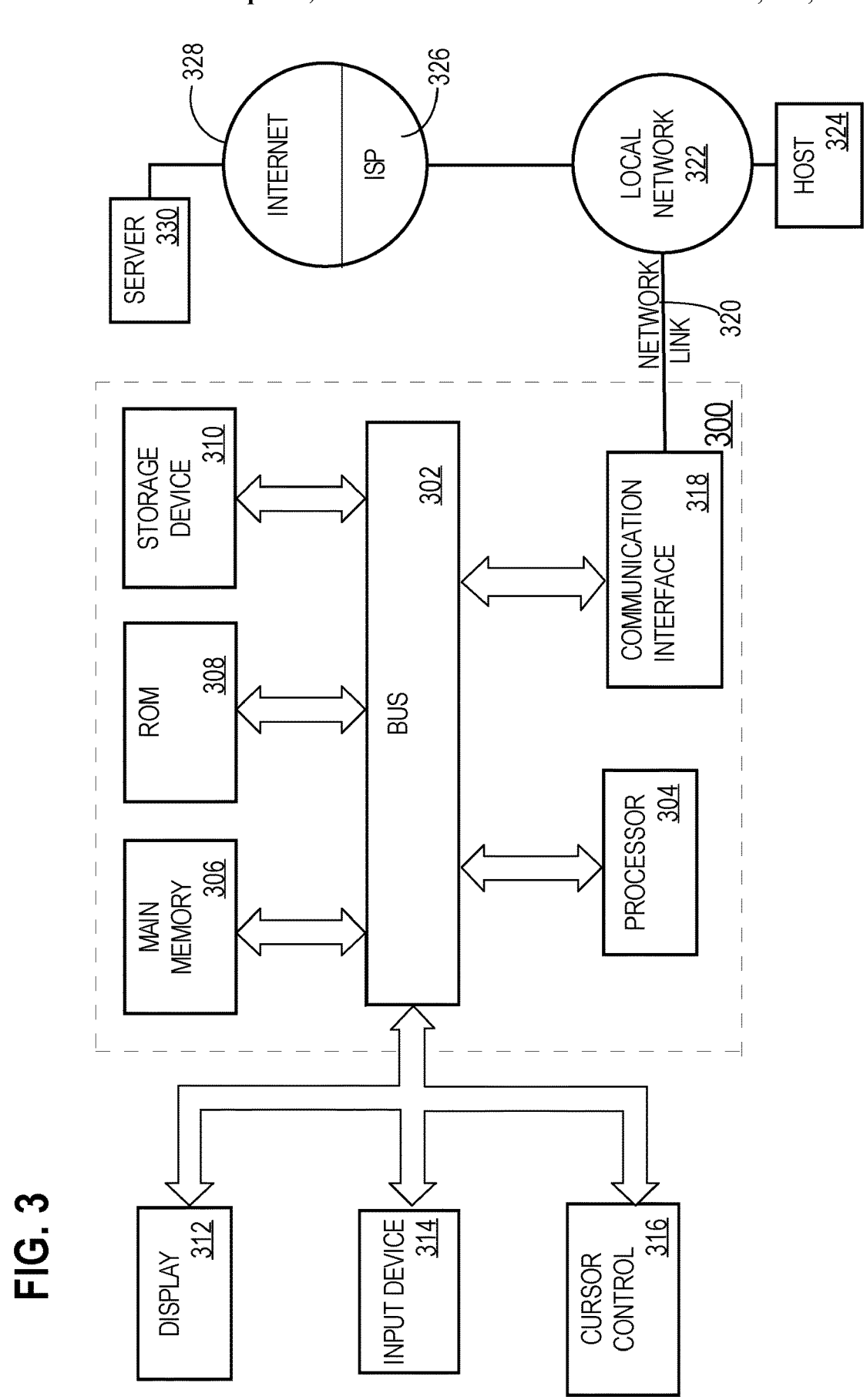
FIG. 3 is a block diagram of a computer system on which embodiments may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   training, based on a set of sequential training data, a recurrent neural network that is equipped with a differentiable set data structure;
   wherein training the recurrent neural network comprises: performing one or both of:
      adding an element to the differentiable set data structure based, at least in part, on a hidden state of the recurrent neural network, and
      performing a query over the differentiable set data structure based, at least in part, on the hidden state of the recurrent neural network; and
   after performing one or both of adding the element and performing the query, generating a prediction, based on output of the query, without using the hidden state of the recurrent neural network;
   wherein training the recurrent neural network produces a trained recurrent neural network;
   generating, by the recurrent neural network, a new query that contains a vector that represents a value in an unlabeled sequence that is syntactically valid, wherein the vector contains a plurality of weights that are less than 0.5 and one weight that is greater than 0.5; and
   based on the new query that contains the vector that represents the value, the trained recurrent neural network, and the differentiable set data structure, detecting that the unlabeled sequence is semantically invalid;
   wherein the method is performed by one or more computing devices.

2. The method of claim 1, wherein:
   adding the element to the differentiable set data structure is performed via a continuous operation; and
   performing the query over the differentiable set data structure is performed via a continuous operation.

3. The method of claim 1, wherein:
   the differentiable set data structure represents a logical set of values; and
   the differentiable set data structure stores a plurality of probabilities that indicate whether corresponding values, that correspond to the plurality of probabilities, are included in the logical set of values.

4. The method of claim 1, wherein:
   the differentiable set data structure represents a logical set of values;
   training the recurrent neural network that is equipped with the differentiable set data structure comprises:
      generating a control command based on a sigmoid activation function and the hidden state of the recurrent neural network;
      wherein the control command indicates a probability that a particular value will be added to the logical set of values.

5. The method of claim 4, wherein training the recurrent neural network that is equipped with the differentiable set data structure further comprises:
   generating a new probability that the particular value is included in the logical set of values by adding the control command to a previous probability that the particular value is included in the logical set of values.

6. The method of claim 5, wherein generating the new probability comprises:
   determining whether a value for the new probability is greater than 1; and
   in response to determining that the value for the new probability is greater than one, setting the value for the new probability to 1;
   wherein the value for the new probability is included in the differentiable set data structure.

7. The method of claim 1, wherein training the recurrent neural network that is equipped with the differentiable set data structure comprises:
   generating, based on a sigmoid activation function and the hidden state of the recurrent neural network, a location vector that indicates a location of a particular value within the differentiable set data structure.

8. The method of claim 1, wherein:
the set of sequential training data comprises one or more sequences of words;
the method further comprises at least one selected from the group consisting of:
a) identifying one or more properties of the sequence of unlabeled data based, at least in part, on the trained recurrent neural network and the differentiable set data structure, and b) performing both of:
determining whether the particular word is identified in the differentiable set data structure; and
classifying a portion of the sequence of unlabeled data based, at least in part, on determining that the particular word is identified in the differentiable set data structure.

9. The method of claim 1, wherein backpropagation is used to train the recurrent neural network that is equipped with the differentiable set data structure.

10. The method of claim 1, wherein the differentiable set data structure is implemented with a Bloom filter.

11. The method of claim 1, wherein the recurrent neural network is a Long Short-Term Memory Recurrent Neural Network.

12. The method of claim 1, wherein training the recurrent neural network comprises performing a mixture of said adding the element to the differentiable set data structure and said performing the query over the differentiable set data structure.

13. The method of claim 1, wherein:
adding the element to the differentiable set data structure is further based, at least in part, on a value generator hash;
the performing the query over the differentiable set data structure is based on multiple positions within the differentiable set data structure; and
said output of the query represents a probability that a query element is represented by the differentiable set data structure.

14. The method of claim 1, wherein the differentiable set data structure is represented as an array.

15. One or more non-transitory computer-readable media storing instructions that, when executed by one or more processors, cause:
training, based on a set of sequential training data, a recurrent neural network that is equipped with a differentiable set data structure;
wherein training the recurrent neural network comprises:
performing one or both of:
adding an element to the differentiable set data structure based, at least in part, on a hidden state of the recurrent neural network,
performing a query over the differentiable set data structure based, at least in part, on the hidden state of the recurrent neural network; and
after performing one or both of adding the element and performing the query, generating a prediction, based on output of the query, without using the hidden state of the recurrent neural network;
wherein training the recurrent neural network produces a trained recurrent neural network;
generating, by the recurrent neural network, a new query that contains a vector that represents a value in an unlabeled sequence that is syntactically valid, wherein the vector contains a plurality of weights that are less than 0.5 and one weight that is greater than 0.5; and
based on the new query that contains the vector that represents the value, the trained recurrent neural network, and the differentiable set data structure, detecting that the unlabeled sequence is semantically invalid.

16. The one or more non-transitory computer-readable media of claim 15, wherein:
adding the element to the differentiable set data structure is performed via a continuous operation; and
performing the query over the differentiable set data structure is performed via continuous operation.

17. The one or more non-transitory computer-readable media of claim 15, wherein:
the differentiable set data structure represents a logical set of values; and
the differentiable set data structure stores a plurality of probabilities that indicate whether corresponding values, that correspond to the plurality of probabilities, are included in the logical set of values.

18. The one or more non-transitory computer-readable media of claim 15, wherein:
the differentiable set data structure represents a logical set of values;
training the recurrent neural network that is equipped with the differentiable set data structure comprises:
generating a control command based on a sigmoid activation function and the hidden state of the recurrent neural network;
wherein the control command indicates a probability that a particular value will be added to the logical set of values.

19. The one or more non-transitory computer-readable media of claim 18, wherein training the recurrent neural network that is equipped with the differentiable set data structure further comprises:
generating a new probability that the particular value is included in the logical set of values by adding the control command to a previous probability that the particular value is included in the logical set of values.

20. The one or more non-transitory computer-readable media of claim 19, wherein generating the new probability comprises:
determining whether a value for the new probability is greater than 1; and
in response to determining that the value for the new probability is greater than one, setting the value for the new probability to 1;
wherein the value for the new probability is included in the differentiable set data structure.

21. The one or more non-transitory computer-readable media of claim 15, wherein training the recurrent neural network that is equipped with the differentiable set data structure comprises:
generating, based on a sigmoid activation function and the hidden state of the recurrent neural network, a location vector that indicates a location of a particular value within the differentiable set data structure.

22. The one or more non-transitory computer-readable media of claim 15, wherein:
the set of sequential training data comprises one or more sequences of words;
the instructions further cause at least one selected from the group consisting of:
a) identifying one or more properties of the sequence of unlabeled data based, at least in part, on the trained recurrent neural network and the differentiable set data structure, and b) performing both of:

determining whether a particular word is identified in the differentiable set data structure, and classifying a portion of the sequence of unlabeled data based, at least in part, on determining that the particular word is identified in the differentiable set data structure.

23. The one or more non-transitory computer-readable media of claim 15, wherein backpropagation is used to train the recurrent neural network that is equipped with the differentiable set data structure.

24. The one or more non-transitory computer-readable media of claim 15, wherein the differentiable set data structure is implemented with a Bloom filter.

25. The one or more non-transitory computer-readable media of claim 15, wherein the recurrent neural network is a Long Short-Term Memory Recurrent Neural Network.

26. The one or more non-transitory computer-readable media of claim 13, wherein training the recurrent neural network comprises performing a mixture of said adding the element to the differentiable set data structure and said performing the query over the differentiable set data structure.

27. The one or more non-transitory computer-readable media of claim 13, wherein:

adding the element to the differentiable set data structure is further based, at least in part, on a value generator hash;

wherein the performing the query over the differentiable set data structure is based on multiple positions within the differentiable set data structure; and said output of the query represents a probability that a query element is represented by the differentiable set data structure.

28. The one or more non-transitory computer-readable media of claim 13, wherein the differentiable set data structure is represented as an array.

* * * * *